(12) United States Patent
Ponsaa

(10) Patent No.: US 8,408,437 B1
(45) Date of Patent: Apr. 2, 2013

(54) MOTORCYCLE SADDLEBAG APPARATUS AND METHOD

(76) Inventor: Allan Ponsaa, Metairie, LA (US)

( * ) Notice: Subject to any disclaimer, the term of this patent is extended or adjusted under 35 U.S.C. 154(b) by 485 days.

(21) Appl. No.: 12/541,421

(22) Filed: Aug. 14, 2009

(51) Int. Cl.
*B62J 7/00* (2006.01)

(52) U.S. Cl. ......................... 224/429; 224/430

(58) Field of Classification Search ............... 224/429, 224/652, 653, 413, 416, 417, 428, 430, 630, 224/681; 190/110; 150/113; 383/38, 39; 220/528–530
See application file for complete search history.

(56) References Cited

U.S. PATENT DOCUMENTS

| | | | |
|---|---|---|---|
| 340,949 A | 4/1886 | Jackson | |
| 501,821 A | 7/1893 | Browne | |
| 2,517,757 A | 8/1950 | Adlerstein | |
| 3,542,280 A | 11/1970 | Crabtree | |
| 4,171,760 A | 10/1979 | Gay | |
| 4,258,869 A * | 3/1981 | Hilgendorff | 224/429 |
| 4,442,960 A | 4/1984 | Vetter | |
| 4,765,476 A * | 8/1988 | Lee | 206/427 |
| 4,819,793 A * | 4/1989 | Willard et al. | 206/162 |
| 4,848,627 A | 7/1989 | Maeda et al. | |
| 5,040,681 A | 8/1991 | Grusin | |
| 5,042,664 A | 8/1991 | Shyr et al. | |
| 5,405,068 A | 4/1995 | Lovett | |
| 5,518,139 A | 5/1996 | Trower et al. | |
| 5,988,476 A | 11/1999 | Olerio | |
| 6,047,976 A | 4/2000 | Wang | |
| 6,065,821 A | 5/2000 | Anderson et al. | |
| 6,123,239 A | 9/2000 | Lovitt | |
| 6,142,336 A | 11/2000 | Freudelsperger | |
| 6,161,739 A * | 12/2000 | Bentzen | 224/153 |
| 6,176,535 B1 * | 1/2001 | Chaloult et al. | 296/37.16 |
| 6,299,042 B1 | 10/2001 | Smith | |
| 6,341,755 B1 | 1/2002 | Kump | |
| 6,364,329 B1 | 4/2002 | Holub et al. | |
| 6,533,152 B1 * | 3/2003 | Dischler | 224/413 |
| 6,942,269 B2 | 9/2005 | Mains | |
| 7,284,763 B1 | 10/2007 | King | |
| 2005/0121275 A1 * | 6/2005 | Platte | 190/103 |
| 2006/0016840 A1 * | 1/2006 | Svenson et al. | 224/42.32 |

* cited by examiner

*Primary Examiner* — Adam Waggenspack

(74) *Attorney, Agent, or Firm* — Garvey, Smith, Nehrbass & North, L.L.C.; Brett A. North

(57) ABSTRACT

A motorcycle saddlebag storage system employs a specially configured shelf that enables a user to segment a saddlebag interior into multiple sections, each for holding articles (e.g. tools, gloves, supplies).

18 Claims, 4 Drawing Sheets

MOTORCYCLE SADDLEBAG APPARATUS AND METHOD

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to motorcycles and motorcycle panniers or saddlebags. More particularly, the present invention relates to an improved motorcycle saddlebag apparatus featuring a pair of saddlebags, each having an interior for storing articles and a specially configured shelf that removably attaches to the interior walls of the bag. The shelf is configured to be used alone or with other shelves to separate a motorcycle saddlebag into a plurality of compartments.

Many motorcycles are equipped with saddlebags or panniers. These bags are typically positioned next to the rear wheel and on opposing sides of the motorcycle frame. Motorcycle riders carry various objects in these saddlebags including tools, containers, gloves, and the like. When riding, these tools and other objects must be layered one on top of the other creating a disorganized storage environment. Items that are loose (such as various tools) can rattle when they contact each other. This annoys the operator of the motorcycle. Such loose articles can damage one another when they make contact.

BRIEF SUMMARY

The present invention provides a saddlebag apparatus that can be filled to any height. The saddlebags each provide a storage lid that will lock down on the items that have been stored. A shelf is specially configured to function as a divider for segmenting the motorcycle saddlebag into different storage sections or areas. Multiple of these shelves or lids can be used in the same saddlebag. These shelves or lids aide in keeping a rider's gear organized and secure on road trips.

The installation of the shelf and bag apparatus employs a locking arrangement that can be in the form of a Velcro® fastener. One strip of Velcro® material such as the loop material is preferably affixed to the inside front surface of the saddlebag. The adjustable storage covers or lids or shelves can then be installed in between the saddlebag bottom and the open top.

In one embodiment, only an attachment on one forward end of the shelf or lid is locked in place whereas the remaining portion of the storage shelf or lid rests upon items that are stored below it. In one embodiment locking arrangements or tabs can be included on front and rear sections of the shelf or lid. In one embodiment locking arrangements or tabs can be included on all four sides of the shelf or lid The apparatus of the present invention can employ a panel such as, for example, Luan Plywood. In other embodiments the panel can be plastic, fiberglass, metal, or a composite material.

The panel or shelf can be sized and shaped to exactly fit a horizontal section through the saddlebag. The panel is preferably covered with a carpet material on an upper surface and a foam rubber material on the bottom surface. A Velcro® strip (hook material or hook side) is applied to the front top surface of the panel which provides one side of the lock. A one inch wide, six inch long piece of nylon web strap can be used to provide a loop or handle for removing and installing the shelf. This strap is inserted through a hole in the top of the panel and attached to the bottom. A grommet or other fastener can be used to install over the strap. A molding or border such as 5/32 inch hose can be installed along the edge of the panel. This molding or border material provides a cushion and a tight fit in between the panel and the walls of the saddlebag when the panel is installed on the saddlebag. A one inch wide by eight inch strip of Velcro® (first side or loop side) acts as the other part of the lock. It can be installed in the front center inside wall of the saddlebag.

The present invention thus provides an improved motorcycle bag apparatus. In one embodiment, the motorcycle bag apparatus can include the motorcycle having a frame.

The apparatus can include a pair of saddlebags attached to the frame, each bag having a plurality of wall panes, such as a bottom panel, front and real panels, and a pair of side panels.

Each saddlebag provides an open top and interior and a lid that removably attaches to the wall panels to closed the top of the interior.

One or more shelves are provided that are each removably attachable to the saddlebag interior in a generally transverse or horizontal position. Each shelf enables articles to be stored under or to rest upon the shelf.

Each shelf has a periphery and connectors at the periphery that connect with one or more panels of the saddlebag.

In one embodiment, hook and loop portions connect to attach the shelf to a wall panel of the saddlebag.

In one embodiment, one of said shelf and said wall panel has a hook portion and the other has a loop portion.

In one embodiment, the forward panel of the saddlebag is inclined and has an inclined inner surface with either hook or loop material thereon. The shelf would have a connecting material such as the opposite of the loop or hook material applied to the inner surface of the saddlebag.

In one embodiment, the front panel and rear panel are each inclined and wherein each have an inner surface with either hook or loop material to which the shelf will connect. In any case, if the inside panel or panels of the saddlebag have loop material, the shelf will be provided with hook material. Conversely, if an inside or inside surfaces of the saddlebag are provided with hook material, the shelf or shelves will be provided with loop material.

In one embodiment, the shelf has a peripheral border or mold material that engages the saddlebag wall panels. This peripheral material can be flexible material such as silicone.

The present invention also provides a method of storing articles on a motorcycle. The method includes the providing of a motorcycle and a pair of saddlebags, each saddlebag with an outer wall comprised of a plurality of outer wall panels and an interior.

A shelf is attached to the saddlebag, the shelf segmenting the saddlebag interior into upper and lower chambers.

The method includes providing cooperating connecting portions on the saddlebag and the shelf, which enable the shelf to be placed at any one of multiple, different elevational positions within the saddlebag interior.

A handle or loop is provided on the shelf next to a connector so that a user can easily manipulate the shelf when attaching it to or removing it from the saddlebag interior.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
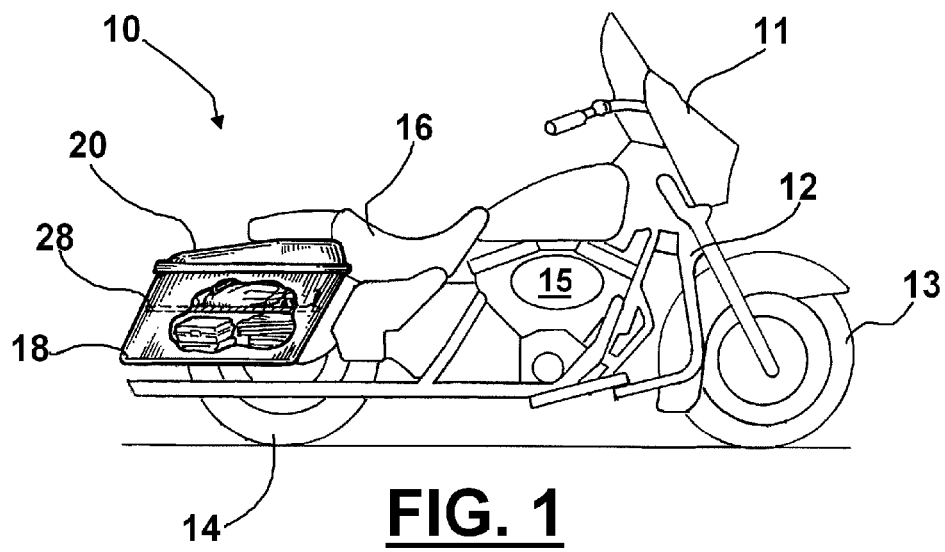
FIG. 1 is an elevation view of the preferred embodiment of the apparatus of the present invention.

FIGS. 1-10 show the preferred embodiment of the apparatus of the present invention designated generally by the numeral 10. Motorcycle saddlebag apparatus 10 can be used with the saddlebags 17, 18 of the motorcycle. In FIG. 1, the motorcycle 11 typically provides a frame 12, front wheel 13, rear wheel 14, engine 15, and driver's seat 16. Left bag 17 and right bag 18 are saddlebags mounted on opposing sides of frame 12 and on opposing sides of rear wheel 14.

Figure 9:
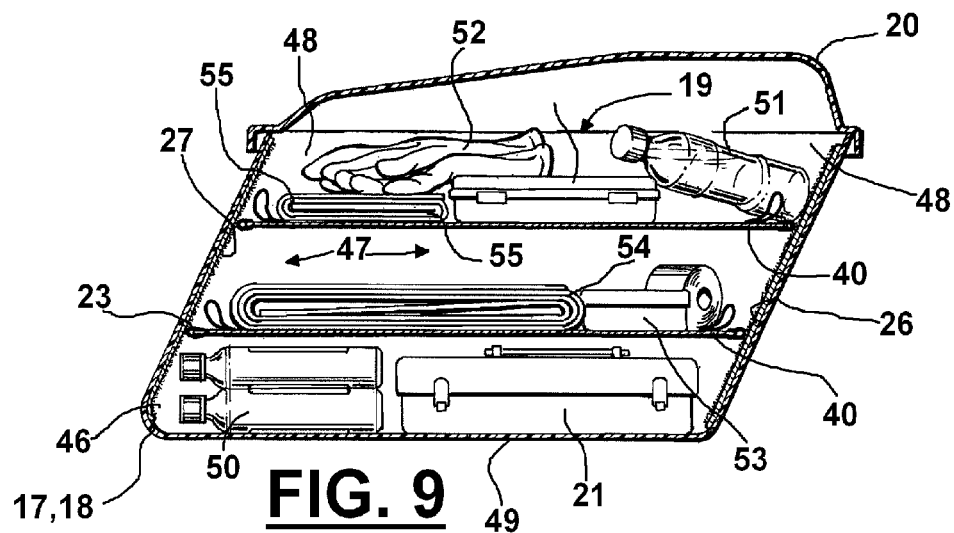
FIG. 9 is a side partially cutaway view of the preferred embodiment of the apparatus of the present invention.
Figure 10:
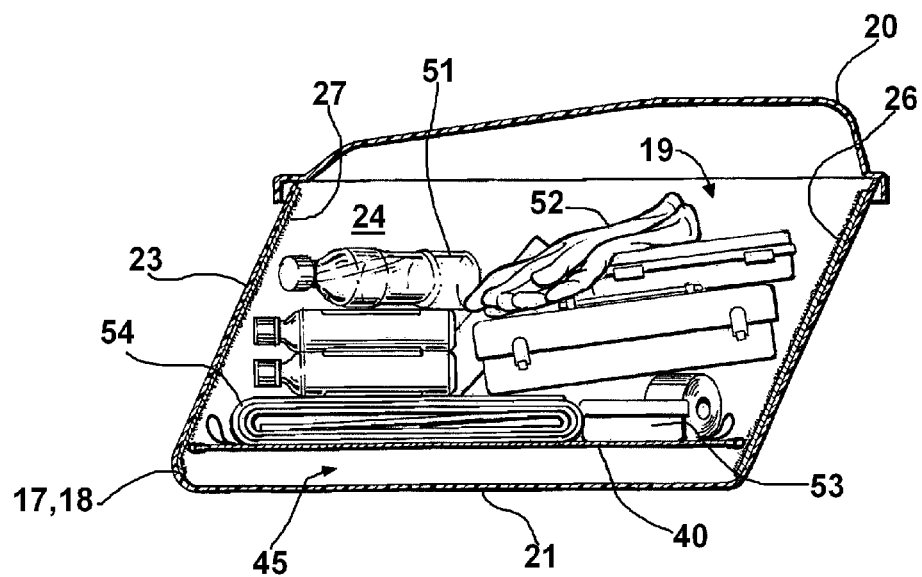
FIG. 10 is a side partially cutaway view of the preferred embodiment of the apparatus of the present invention.

Each bag 17, 18 provides a bag open top 19 and a lid 20 that can be pivotably or removably attached to the selected bag 17 or 18. Each bag 17, 18 has a bottom panel 21. Each bag can provide a front panel 22 and a rear panel 23. In one embodiment, these front and rear panels 22, 23 are inclined as shown in FIGS. 9 and 10. Each saddlebag 17, 18 provides side panels 24, 25. The front panel 22 provides an inside surface that is preferably lined with a fabric or loop material 26. Similarly, the rear panel 23 has an inside surface that is lined with a fabric or loop material 27.

A shelf 28 is configured to fit inside of either of the bags 17, 18. Each shelf 28 provides a panel 29 that can be for example a plywood material or other structural material such as plastic or metal. Shelf 28 can provide a lower layer (e.g. foam layer) 30 and an upper layer of fabric/carpet 31.

Panel 28 can have a trim, border or molding 32. This trim/border/molding is used to form a snug fit between each shelf 28 and the inside surfaces of the front 22, rear 23, side 24, and side 25 panels. In one embodiment the trim, border or molding can be comprised of form fitting rubber (e.g., extruded), plastic, leather, and/or vinyl.

Figure 3:
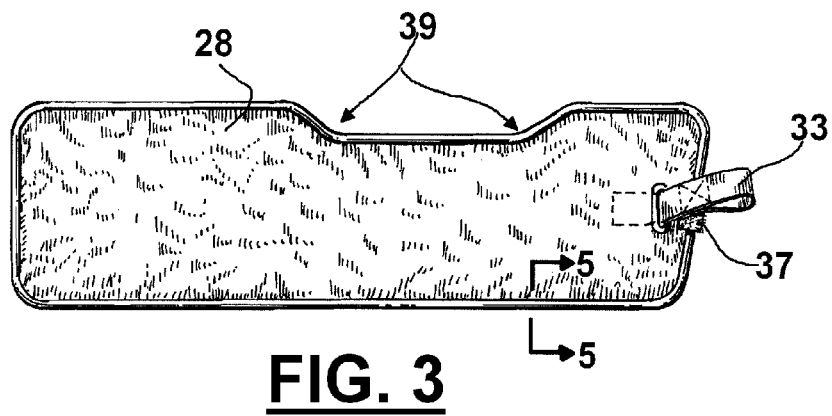
FIG. 3 is a view taken along lines 3-3 of FIG. 2.
Figure 4:
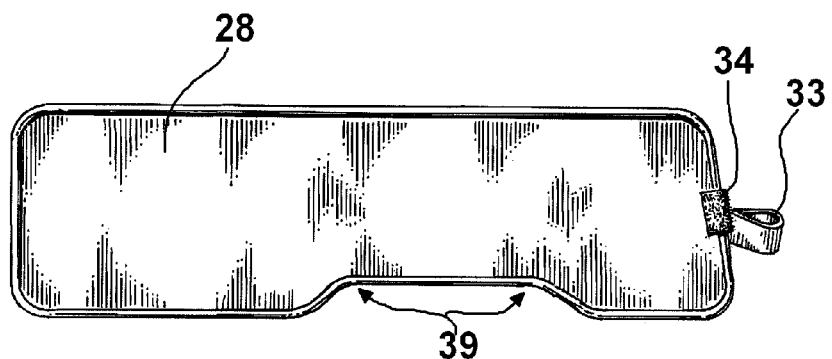
FIG. 4 is a view taken along lines 4-4 of FIG. 2.
Figure 5:
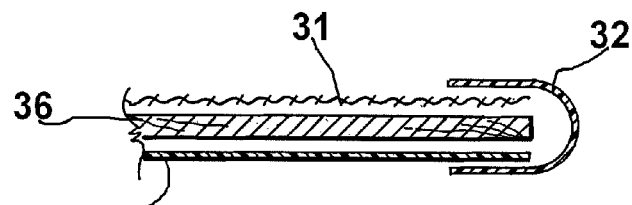
FIG. 5 is a sectional view taken along lines 5-5 of FIG. 3.
Figure 6:
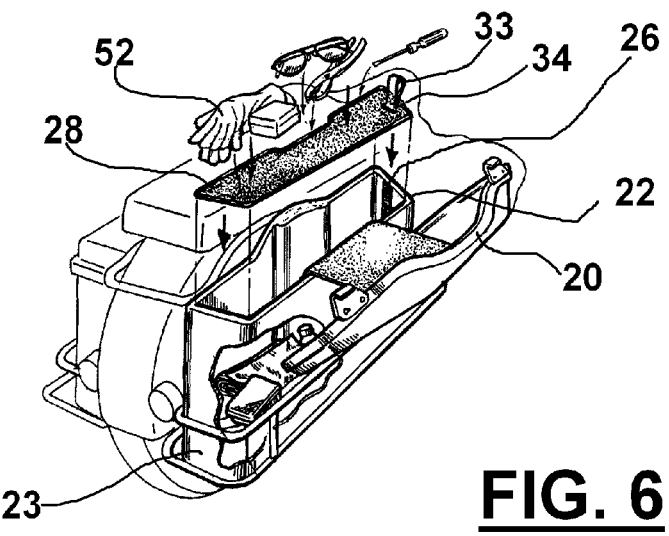
FIG. 6 is a partial perspective, partially cutaway view of the preferred embodiment of the apparatus of the present invention.

Shelf 28 has a handle or loop 33 affixed to one end of the shelf 28 as shown in FIG. 3. In one embodiment handle or loop 33 can be a woven strapping, or cloth, leather, vinyl, plastic, or nylon.

Figure 2:
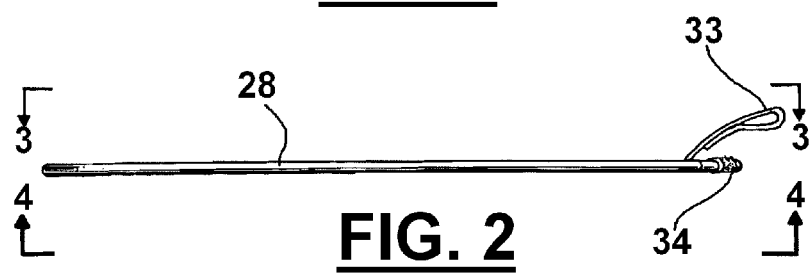
FIG. 2 is a side fragmentary view of the preferred embodiment of the apparatus of the present invention.

Hook material 34 is provided on shelf 28 next to loop 33 as shown in FIGS. 2 and 3. The shelf 28 can be about 6-7 inches wide and about 21-22 inches long as an example. The loop 33 is preferably about 3 inches long and has a width of about 1 inch. The hook material 34 is preferably about 1-2 inches wide. A recess 39 is exemplary of a shape that is provided to conform to the inner surface of a saddlebag side panel 24 or 25.

Figure 7:
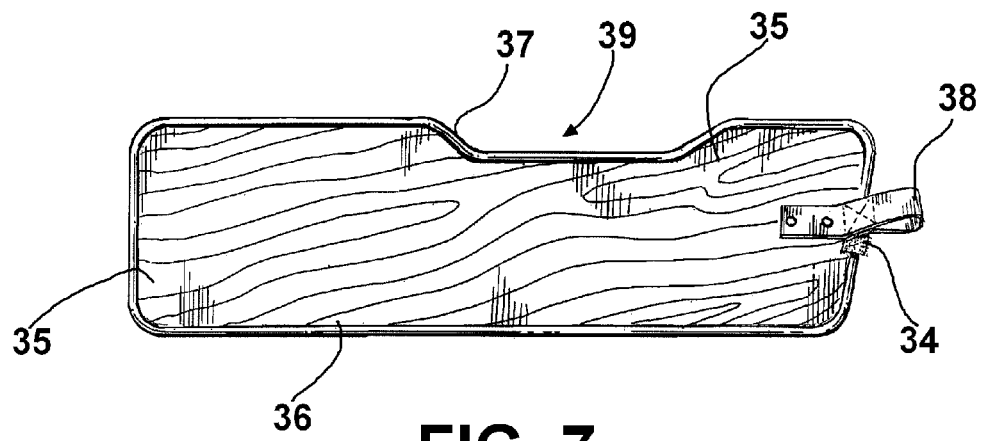
FIG. 7 is a plan fragmentary view of the preferred embodiment of the apparatus of the present invention.
Figure 8:
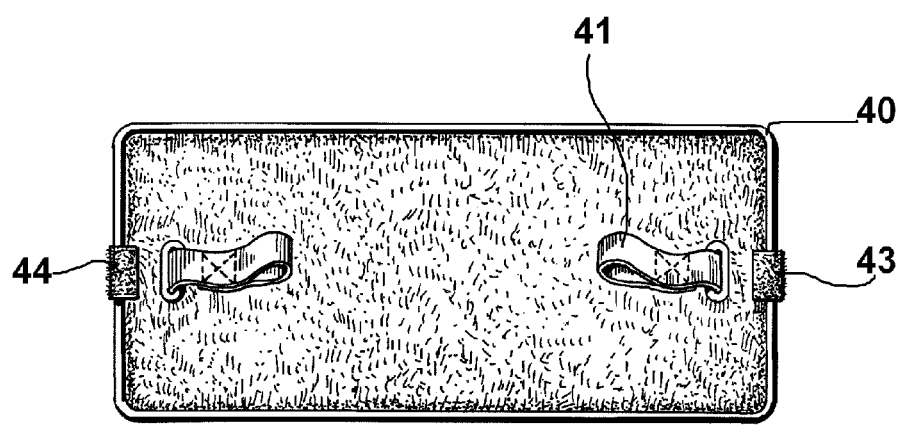
FIG. 8 is another fragmentary view of the preferred embodiment of the apparatus of the present invention.

FIGS. 7 and 8 show an alternate construction for a shelf, designated by the numeral 35. The shelf 35 has a panel 36 that is of wood material. The panel 36 can be stained or varnished to provide an aesthetic, pleasing look. The panel 36 can be provided with a border, piping or trim 37 as with the shelf 28. A handle or loop 38 can be provided at one end as with the shelf 28. Hook material 34 is provided as with the shelf FIG. 8 shows a shelf 40 having a pair of handles or loops 41, 42 at opposing end portions of the shelf 40. For each of the handles or loops 41, 42, there is provided a connecting hook material portion at 43 and 44 as shown in FIG. 8. For the shelf shown in FIG. 8, both the front panel 22 and the rear panel 23 of the saddlebags 17, 18 form a connection to the shelf 40.

Notice in FIGS. 9 and 10 that the front panel 22 has a cloth or loop material 26 as does the inside surface of the rear panel 23. The inside surface of the rear panel 23 is provided with cloth or loop material at 27. For the shelf 40, the hook material 43 connects with the loop material 26. The hook material 44 connects with the loop material 27.

Handles or loops 41, 42 enable a user to life or lower the shelf to a selected elevational position within a saddlebag 17 or 18 and then affix the shelf 40 to the saddlebag interior.

By providing continuous loop material at 26, 27 for connection to the hook material 43, 44 of the shelf 40, the shelf 40 can be affixed relative to the saddlebag 17 or 18 at virtually infinite elevational positions. This feature enables a user to segment the saddlebag 17, 18 interior to custom fit the articles to be carried. Notice in FIG. 1 that a single shelf 28 is used for carrying bulky articles. In FIG. 9, two shelves 40 segment the bag interior into three sections or compartments 46, 47, 48. Examples of articles stored in FIGS. 9-10 are tool box 49, motor oil containers 50, water bottle 51, gloves 52, first aid kit 53 and folded tarps or sheets 54, 55.

In FIG. 10, the sheet 28 functions as a false bottom so that valuables can be contained below it in hidden space 45. In such a case, panel 28 can have a color and texture that matches the color and texture of the interior surfaces of the saddlebag 17, 18.

The following is a list of parts and materials suitable for use in the present invention.

| PARTS LIST | |
|---|---|
| Part Number | Description |
| 10 | motorcycle saddlebag apparatus |
| 11 | motorcycle |
| 12 | frame |
| 13 | front wheel |
| 14 | rear wheel |
| 15 | engine |
| 16 | seat |
| 17 | left saddlebag |
| 18 | right saddlebag |
| 19 | bag open top |
| 20 | lid |
| 21 | bottom panel |
| 22 | front panel |
| 23 | rear panel |
| 24 | side panel |
| 25 | side panel |
| 26 | fabric/loop material |
| 27 | fabric/loop material |
| 28 | shelf |
| 29 | panel |
| 30 | lower layer/foam layer |

-continued

PARTS LIST

| Part Number | Description |
| --- | --- |
| 31 | upper layer/fabric/carpet |
| 32 | trim/border/molding |
| 33 | loop/handle |
| 34 | hook material |
| 35 | shelf |
| 36 | panel/wood |
| 37 | piping/tape/border |
| 38 | loop/handle |
| 39 | recess |
| 40 | shelf |
| 41 | loop/handle |
| 42 | loop/handle |
| 43 | hook material |
| 44 | hook material |
| 45 | hidden compartment |
| 46 | lower compartment |
| 47 | middle compartment |
| 48 | upper compartment |
| 49 | tool box |
| 50 | oil containers |
| 51 | water bottle |
| 52 | gloves |
| 53 | first aid kit |
| 54 | tarp/folded sheet |
| 55 | tarp/folded sheet |

All measurements disclosed herein are at standard temperature and pressure, at sea level on Earth, unless indicated otherwise. All materials used or intended to be used in a human being are biocompatible, unless indicated otherwise. The foregoing embodiments are presented by way of example only; the scope of the present invention is to be limited only by the following claims.

The invention claimed is:

1. A method of storing articles on a motorcycle comprising the steps of:
   a) providing a motorcycle, the motorcycle having a side saddlebag, the saddlebag having outer wall panels, the panels being a front, two side, a rear, and a bottom panel, the panels defining an interior with a bottom and a top, the top having a top cover which can be opened providing access to the interior, the saddlebag having items stored in the interior at the bottom;
   b) providing a shelf, the shelf having top and bottom faces, forward and rear ends, and left and right sides, the shelf including a handle and cooperating connecting portion located at its forward end; and
   c) with the top cover of the saddlebag open, from the top of the saddlebag inserting the shelf into the interior of the saddle bag at a level which is below the top of the interior and above the bottom of the interior, and attaching the cooperating connecting portion of the shelf to the front panel of the saddlebag to lock in place the forward end of the shelf to the front panel of the saddlebag at a first vertical level between the top and bottom of the interior, while the left and right sides along with the rear of the shelf are not vertically locked in place, but with the rear end of the shelf being located at a second vertical level between the top and bottom of the interior, the rear panel of the saddlebag restricting vertical movement of the rear end of the shelf towards the top of the interior while simultaneously not restricting vertical movement of the rear end of the shelf towards the bottom of the interior, and allowing the bottom of the shelf to rest upon the items stored in the interior of the saddlebag, the shelf dividing the saddlebag interior into upper and lower chambers.

2. The method of claim 1 wherein in step "c" the connecting portions are hook and loop portions.

3. The method of claim 1 wherein the handle is located next to one of the connecting portions.

4. The method of claim 1 wherein the handle is a loop.

5. The method of claim 1 wherein the connecting portion on the saddlebag is a continuous area of loop material that extends between upper and lower portions of the saddlebag.

6. The method of claim 5 wherein the connecting portion on the shelf is a strip of hook material.

7. The method of claim 1 wherein the connecting portion on the saddlebag is a continuous area of hook material that extends between upper and lower portions of the saddlebag.

8. The method of claim 5 wherein the connecting portion on the shelf is a strip of loop material.

9. The method of claim 1 wherein the shelf has an upper surface and the handle extends above said upper surface.

10. The method of claim 1 wherein there are a pair of handles at opposing ends of the shelf.

11. The method of claim 10 wherein there are a pair of connecting portions on the shelf.

12. The method of claim 1, wherein the rear portion of the shelf does not include a connecting portion and is not locked in place relative to the saddlebag.

13. The method of claim 1, wherein after step "c" a second shelf is provided, the shelf having top and bottom faces, forward and rear ends, and left and right sides, the second shelf including a handle and cooperating connecting portion located at its forward end, and the second shelf is inserted from the top of the saddlebag into the interior of the saddlebag above the shelf inserted in step "c", the second shelf and shelf inserted in step "c" separating the saddlebag interior into three vertical chambers.

14. The method of claim 13, wherein the rear portion of the second shelf does not include a connecting portion and is not locked in place relative to the saddlebag.

15. The method of claim 1, wherein the front and rear panels of the saddlebag are vertically inclined.

16. The method of claim 15, wherein the front and rear panels of the saddlebag are parallel to each other.

17. The method of claim 1, wherein the first and second vertical levels are equal making the shelf horizontal.

18. The method of claim 1, wherein the first vertical level is a position which is above the items stored in the interior of the saddlebag.

\* \* \* \* \*